(12) United States Patent
Fleming, III

(10) Patent No.: US 6,473,752 B1
(45) Date of Patent: Oct. 29, 2002

(54) METHOD AND SYSTEM FOR LOCATING DOCUMENTS BASED ON PREVIOUSLY ACCESSED DOCUMENTS

(75) Inventor: Hoyt A. Fleming, III, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 08/985,155

(22) Filed: Dec. 4, 1997

(51) Int. Cl.[7] ............................................... G06F 17/30

(52) U.S. Cl. .................... 707/4; 707/5; 707/6; 707/102

(58) Field of Search ......................... 707/4, 2, 10, 102, 707/5, 6

(56) References Cited

U.S. PATENT DOCUMENTS

| | | | |
|---|---|---|---|
| 4,034,071 A | 7/1977 | Thomas et al. ............... | 714/31 |
| 4,334,307 A | 6/1982 | Bourgeois et al. ............ | 714/45 |
| 4,433,413 A | 2/1984 | Fasang ........................ | 714/732 |
| 4,881,230 A | 11/1989 | Clark et al. ................. | 714/712 |
| 4,964,125 A | 10/1990 | Kim ............................ | 714/26 |
| 5,010,551 A | 4/1991 | Goldsmith et al. ........... | 714/46 |

(List continued on next page.)

OTHER PUBLICATIONS

DeJesus, Edmund X., "The Searchable Kingdom" *Byte*, 22: 6, Jun. 1997, 7 pages.

"Ultraseek Server Detailed Feature List", Infoseek web page, 1997 http://software.infoseek.com/products/ultraseek/ultrafeatures.htm, pp. 1–8, (visited Aug. 27, 1997.)

"When should the Advanced Query form be used", Help Advanced Search, Alta Vista, a Digital Internet Service web page, 1997, pp. 1–4, http://www.altavista.digital.com/av/content/help_advanced.htm, (visited Apr. 9, 1998.)

"Cow9's Standard View", Help Refine, Alta Vista, a Digital Internet Service web page, 1997, pp. 1–2, http://www.altavista.digital.com/av/content/help_refine.htm (visited Apr. 9, 1998.)

"Simple Query Help, Advanced Query Help, Refine help, Adding or Removing a Page from the Index, Frequently Asked Questions", Alta Vista, A Digital Internet Service web page, 1997, 1 page, http://www.altavista.digital.com/av/content/help.htm, visited (Apr. 9, 1998.)

Office of Automation Concepts Implementation, "PALM 3 User's Guide," Oct. 11, 1982.

*Primary Examiner*—Sanjiv Shah
(74) *Attorney, Agent, or Firm*—Dorsey & Whitney LLP

(57) ABSTRACT

A system for locating computer documents or data of interest to a user without specification by the user of topics of interest. The system detects the selection of computer documents by the user of the system, and analyzes the contents of the selected computer documents to identify topics to which the contents are related. The system also monitors the user's interactions with the selected computer documents. The system then proceeds without user intervention, using the identified topics and the monitored user interaction information to generate topics of interest to the user. The system next determines a level of user interest in the various generated topics, and prioritizes the generated topics on the basis of these levels. The system then uses the prioritized generated topics of user interest to locate documents whose contents are of interest to the user, and makes the located documents available to the user for selection. The located documents can be on any computer or device that is accessible to the system, and the documents can be located in different manners. For example, a computer document search engine can be used to locate additional documents by generating an appropriate search query. Alternately, the selection order can be prioritized for documents or data that are designated for future selection by the user, or live data feeds (where data is accessible for only a short time) can be monitored for data or documents of interest that will be selected for the user while the data is still accessible.

29 Claims, 11 Drawing Sheets

U.S. PATENT DOCUMENTS

| | | | | |
|---|---|---|---|---|
| 5,182,705 A | | 1/1993 | Barr et al. | 705/11 |
| 5,455,933 A | | 10/1995 | Schieve et al. | 714/27 |
| 5,459,657 A | | 10/1995 | Wynn et al. | 705/32 |
| 5,463,766 A | | 10/1995 | Schieve et al. | 713/2 |
| 5,493,492 A | | 2/1996 | Cramer et al. | 705/32 |
| 5,519,832 A | | 5/1996 | Warchol | 714/46 |
| 5,521,842 A | | 5/1996 | Yamada | 709/224 |
| 5,710,887 A | | 1/1998 | Chelliah et al. | 705/26 |
| 5,715,374 A | | 2/1998 | Heckerman et al. | 706/46 |
| 5,717,923 A | * | 2/1998 | Dedrick | 707/102 |
| 5,720,001 A | | 2/1998 | Nguyen | 706/59 |
| 5,724,567 A | * | 3/1998 | Rose et al. | 707/2 |
| 5,761,662 A | * | 6/1998 | Dasan | 707/10 |
| 5,771,354 A | | 6/1998 | Crawford | 709/229 |
| 5,784,539 A | | 7/1998 | Lenz | 706/45 |
| 5,794,237 A | | 8/1998 | Gore, Jr. | 707/5 |
| 5,796,952 A | * | 8/1998 | Davis et al. | 395/200.54 |
| 5,802,493 A | | 9/1998 | Sheflott et al. | 705/1 |
| 5,802,504 A | | 9/1998 | Suda et al. | 706/11 |
| 5,838,682 A | | 11/1998 | Dekelbaum et al. | 370/401 |
| 5,884,045 A | | 3/1999 | Kurihara | 709/237 |
| 5,903,642 A | | 5/1999 | Schwartz et al. | 379/309 |
| 5,915,010 A | | 6/1999 | McCalmont | 379/212.01 |
| 5,918,207 A | | 6/1999 | McGovern et al. | 705/1 |
| 5,970,468 A | | 10/1999 | Bull | 705/11 |
| 6,014,658 A | | 1/2000 | Pretz | 707/2 |

* cited by examiner

| DOCUMENTS ACCESSED | USAGE INFORMATION | EXTRACTED TERMS |
|---|---|---|
| Document — 810 | 820 | 830 |
| President Clinton Announces New Standards<br>Today, President Clinton announced new standards for educational testing. While local teachers were skeptical, President Clinton insisted that the current *educational system* was broken, and needed to be fixed.... | 8/17<br>10:50-11:30  Open; View; Close<br>1:30-1:55   Open; View; Close<br><br>8/19<br>4:05-5:35   Open; View; Close | President Clinton<br>educational system<br>standards<br>testing<br>teachers<br>broken |
| Document — 840 | 850 | 860 |
| US To Send Aid To Latin America<br>In a change of foreign policy, the White House announced that several *Latin American* countries would receive assistance for domestic programs such as medical relief, environmental protection, and schools. On a recent trip, President Clinton & Hillary Clinton observed efforts to make improvements that President Clinton stated were standards elsewhere.... | 8/17<br>11:30-11:45  Open; View; Close<br><br>8/18<br>2:15-2:25   Open; View; Close | US<br>aid<br>Latin America<br>White House<br>foreign policy<br>medical relief<br>environmental protection<br>schools<br>President Clinton<br>Hillary Clinton<br>standards |
| Document — 870 | 880 | 890 |
| Schools Reappear in Puget Sound<br>After a five year absence, schools of fish have been sighted in the Puget Sound area, leading local fishermen to express surprise and relief... | 8/17<br>11:50-11:52  Open; View; Close | schools<br>Puget Sound<br>fish<br>fishermen |

*Fig. 8*

TOPIC IMPORTANCE CALCULATIONS & PRIORITIZATIONS 1010

| Topics | Number of Documents That Contain | Length Of Time Spent Accessing (minutes) | Last Access (days) | Frequency of Access (per day) | Average Repetition In Documents That Contain | Importance In Text Of Documents That Contain (1-5) | Overall Importance |
|---|---|---|---|---|---|---|---|
| Group 1 | | | | | | | |
| President Clinton | 2 | 180 | 1 | 5/3 | 2.5 | 4 | 3.5 |
| White House | 1 | 25 | 2 | 2/3 | 1 | 2 | 4.4 |
| US | 1 | 25 | 2 | 2/3 | 1 | 4 | 2.4 |
| | | | | | | | 2.7 |
| Group 2 | | | | | | | |
| educational system | 1 | 155 | 1 | 1 | 1 | 3 | 3.4 |
| testing | 1 | 155 | 1 | 1 | 1 | 2 | 2.9 |
| standards | 2 | 180 | 1 | 5/3 | 1.5 | 3 | 2.7 |
| schools | 1 | 25 | 2 | 2/3 | 1 | 2 | 3.9 |
| teachers | 1 | 155 | 1 | 1 | 1 | 2 | 2.4 |
| | | | | | | | 2.7 |
| Group 3 | | | | | | | |
| broken | 1 | 155 | 1 | 1 | 1 | 2 | 2.7 |
| | | | | | | | 2.7 |
| Group 4 | | | | | | | |
| Latin America | 1 | 25 | 2 | 2/3 | 2 | 5 | 3.2 |
| ... | | | | | | | 3.2 |

*Fig. 10A*

POSSIBLE GENERATED SEARCH QUERIES

Any Group 1 term ⟵ 1050
(i.e., 'President Clinton OR White House OR US OR Bill Clinton OR Hillary Clinton OR Arkansas Governor')

Any two Group 1 terms ⟵ 1060
(ANY-2-OF (President Clinton, White House, US, Bill Clinton, Hillary Clinton, Arkansas Governor))

The most common Group 1 term near any Group 2 term ⟵ 1070
(President Clinton NEAR (educational system OR testing OR standards OR schools OR Secretary of Education OR universities OR teachers OR tests OR exams OR recess); or
(President Clinton WITHIN-10-WORDS-OF (educational system OR testing OR standards OR schools OR Secretary of Education OR universities OR teachers OR tests OR exams OR recess)

Any Group 1 term and any Group 2 term ⟵ 1080
(President Clinton OR White House OR US OR Bill Clinton OR Hillary Clinton OR Arkansas Governor) AND (educational system OR testing OR standards OR schools OR Secretary of Education OR universities OR teachers OR tests OR exams OR recess)

Any Group 1 term and any Group 2 term and any Group 3 term and any Group 4 term . . . ⟵ 1090
. . .

*Fig. 10B*

METHOD AND SYSTEM FOR LOCATING DOCUMENTS BASED ON PREVIOUSLY ACCESSED DOCUMENTS

TECHNICAL FIELD

The present invention relates generally to locating computer documents and more particularly to determining topics of interest to a user and locating documents related to those topics.

BACKGROUND OF THE INVENTION

In the past, personal computer systems worked as stand-alone units, and information was stored on local hard disks or floppy disks. Correspondingly, information retrieval methods were developed for users to locate information or data that they themselves had earlier created and stored on their own computers. For example, hierarchical directory and file systems were developed which enabled users lo manually store related information in files, and then organize related files tog-ether within a particular directory. Database systems were also developed to store large amounts of information that could be accessed by a user.

As computer usage has become increasingly prevalent, a vast amount of information has become available from computers. In particular, interconnecting computers via computer networks has allowed computer users to not only access information that is stored locally on their computers, but also to access information stored on an enormous number of other computers and storage devices. The recent growth in intranets, the World Wide Web (WWW), and the Internet has greatly expanded the amount of computer-accessible information. With information from other computers available, computer users will often wart to access information of interest that they themselves did not create. However, it is often difficult or impossible for a user to even discover all of the information that is available, let alone to select the information that is of interest to them from among these vast possibilities. Various methods have been developed to assist with these problems.

While manually indexing and organizing large amounts of information is possible, this technique does not generally provide a satisfactory solution to the problem of locating computer-accessible information of interest. Instead, various companies have developed information search engines which can automatically index and organize information that is accessible from a computer. This accessible information may be located on any networked computer or storage device that the computer can access, or may be located on the computer system itself. After the information is indexed or organized, these search engines can then search the indexed or organized information to locate particular information of interest.

Information that is located by a search engine is typically made available as one or more computer documents. A computer document comprises related information which is grouped together by human users, either physically or conceptually. A single computer file or a particular entry in a computer database can represent a physical grouping of information into a document, but a document could also be a portion of a file, multiple files, or portions of multiple files. Similarly, a document could be a single database entry, multiple database entries, or portions of multiple database entries. The contents of a computer document will typically be related to one or more topics, and will be composed of various terms that are related to these topics. Such terms include text, but may also include other forms of information such as symbols, images, video clips, audio clips, embedded executable programs, etc. In addition, computer documents on systems such as the WWW are often interconnected with other documents, with the contents of these WWW documents containing references to other accessible documents (these interconnected documents are often referred to as a web of information).

Most information search engines (also referred to as "spiders" because they traverse this web of information) function by performing two separate functions, indexing and searching. During the indexing function, a search engine will be given one or more computer documents. The search engine will analyze the contents of the documents, and create an index of some or all of the terms in the documents. The search engine may also attempt to identify one or more general topics to which the entire document relates. The search engine will next search the documents for references to other computer documents. Upon finding such references, the search engine will access those referenced documents and continue the same process. In this manner, the search engines can eventually traverse and index all computer documents that are interconnected with the first documents given to the search engine. After creating this comprehensive index, the search engine can locate documents by receiving a search query containing terms or topics of interest to a user, and by searching the index to locate documents with corresponding terms or topics.

However, current search engines suffer from numerous drawbacks. For example, if a user wishes to locate information on Apple Computer Corporation, the user may request computer documents containing the term "apple." If the user does so, the search engine is likely to locate a significant number of documents which are related to the term "apple." but which are not related to the computer company. For example, the search engine is likely to locate documents that contain information related to fruit. A search on the WWW is likely to return thousands of documents that contain the term "apple," many of which will not be of interest to the user. Unfortunately, a user typically must access a particular document and begin to view it in order to determine their level of interest in the document. This is a time-consuming process, and it is typically not practical for large numbers of documents. Thus, current search engines can be highly inefficient in locating only relevant documents (i.e., those of interest to a user).

One method of increasing the efficiency of a search is for the user to create a more specific search query. However, in order to perform an efficient search, the user must formulate highly sophisticated search queries. Such queries typically use a form of Boolean logic, requiring the use of AND, OR and NOT terms. Most search engines have implemented even more sophisticated options for their search queries, such as searching only certain portions of documents. Obviously, a user must understand a document's structure to use such an option Even sophisticated computer users can have difficulty formulating efficient search queries. For novice computer users, the problem can be overwhelming.

Users typically have access to a small number of documents that are of interest to them, and often desire to access additional documents which have related contents. However, many computer users are unable to even identify the relevant terms or topics for a particular document which they can already access, and even when given the appropriate terms and topics they are not generally capable of creating an appropriate search query that would allow them to locate additional documents that are of interest.

SUMMARY OF THE INVENTION

Some embodiments of the present invention provide a method and system for locating information of interest to a user, such as computer documents or data, without specification by the user of topics of interest. The system detects when the user of the system selects computer documents, and monitors the user's interactions with the selected computer documents. The system also analyzes the contents of the selected computer documents to identify relevant terms in the contents of the documents, and more generally to identify topics to which the contents are related. The system then proceeds without user intervention, and uses the identified terms and topics and the monitored user interaction information to generate topics of interest to the user. The system next determines a level of user interest in the various generated topics, and prioritizes the generated topics on the basis of these levels so that the topics of most interest receive the highest priority. The system then attempts to locate additional computer documents, on any computer or device that is accessible to the system, whose contents are related to these prioritized generated topics of user interest. One method that the system may use to locate these documents involves identifying a computer document search engine, generating an appropriate search query, and requesting the search engine to perform the search on the generated search query. Softer additional documents are located, they are made available to the user for selection.

In another embodiment, a group of documents or data has been designated by others for selection by the user and the system uses the prioritized generated topics of user interest to prioritize the order of selection within the group so that the documents or data of most interest to the user can be selected first. In yet another embodiment, the system monitors live data feeds (where data is accessible for only a short time), uses the prioritized generated topics of user interest to identify data or documents of interest, and selects the identified data or documents for the user while the data or document is still accessible.

BRIEF DESCRIPTION OF THE DRAWINGS

FIG. 8 is a diagram illustrating examples of accessed documents, their document usage patterns, and terms extracted from the documents.

FIG. 10A shows a table calculating the importance of the extracted terms and generated topics in the documents accessed by the user, and prioritizing the terms and topics based on their calculated importances.

FIG. 10B shows possible search queries which can be generated from the prioritized generated topics.

DETAILED DESCRIPTION OF THE INVENTION

An embodiment of the present invention provides a method and system for determining topics of interest to a computer user without requiring user specification of areas of interest or disinterest, and for identifying documents related to those areas of interest. In particular, the Relevant Document Selector (RDS) system monitors the usage of documents by the computer user, determines topics that are of interest to the user based on the contents of the accessed documents and the usage patterns of the user, performs a search to identify new documents which are related to these topics of interest, and presents these newly identified documents to the computer user as possible documents for the computer user to access in the future.

The RDS system includes a Document Access Monitor, a Topic Analyzer, and a New Document Identifier. The Document Access Monitor detects the access of documents by the user, records document usage information for each accessed document, extracts relevant terms for each accessed document, and sends the recorded usage information and extracted document terms to the Topic Analyzer. The Topic Analyzer receives the recorded usage information and the extracted document terms from the Document Access Monitor, generates topics related to the extracted terms, prioritizes the generated topics, and forwards them to the New Document Identifier. The New Document Identifier receives the prioritized topics from the Topic Analyzer, generates a search query related to the prioritized topics, performs a search of accessible documents using the search query, and identifies documents that contain terms or topics related to the search query. These identified documents are then made available to the user for selection.

Figure 1:
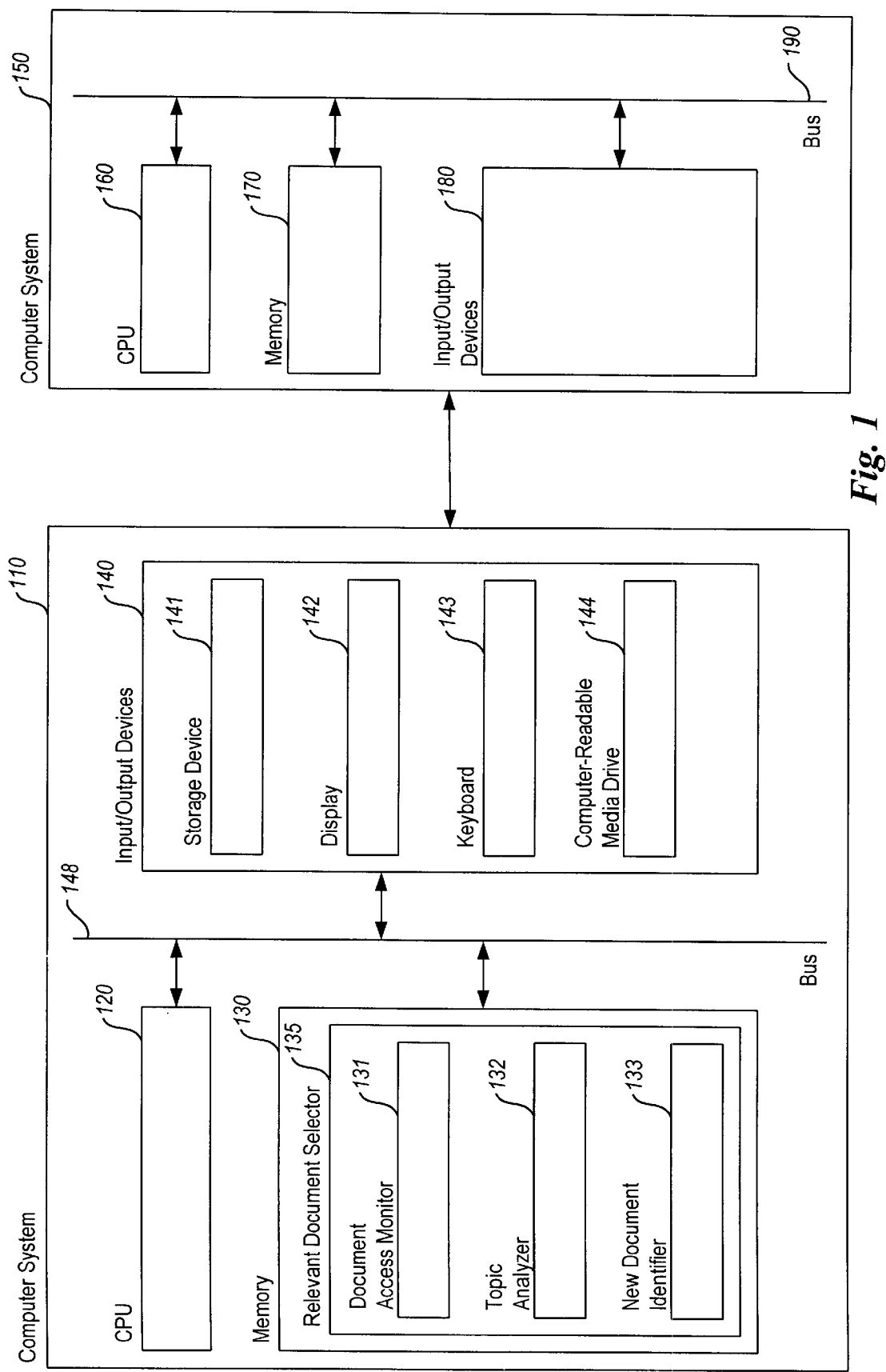
FIG. 1 is a block diagram of the computer network utilized by the present invention.

FIG. 1 illustrates a computer system 110 suitable for executing the Relevant Document Selector (RDS) system, and a computer system 150 which contains documents (not shown) which are accessible to the computer system 110. The computer system 110 includes the CPU 120, the memory 130, the input/output devices 140 and the bus 148. The input/output devices 140 include a storage device 141, a display 142, a keyboard 143 and a computer-readable media drive 144. The memory 130 includes the RDS system 135, which comprises the Document Access Monitor component 131, the Topic Analyzer component 132, and the New Document Identifier component 133. The computer system 150 includes a CPU 160, a memory 170, input/output devices 180, and a bus 190. The computer system 110 can communicate with the computer system 150, and can access computer documents located on computer system 150. Those skilled in the art will appreciate that computer systems 110 and 150 are merely illustrative and are not intended to limit the scope of the present invention. The computer systems may contain additional components or may lack some illustrated components, and computer system 110 may be connected to other devices which contain accessible documents, including through a network, through the Internet, or via the World Wide Web (WWW). Accordingly, the present invention may be practiced with other computer system configurations.

Figure 2:
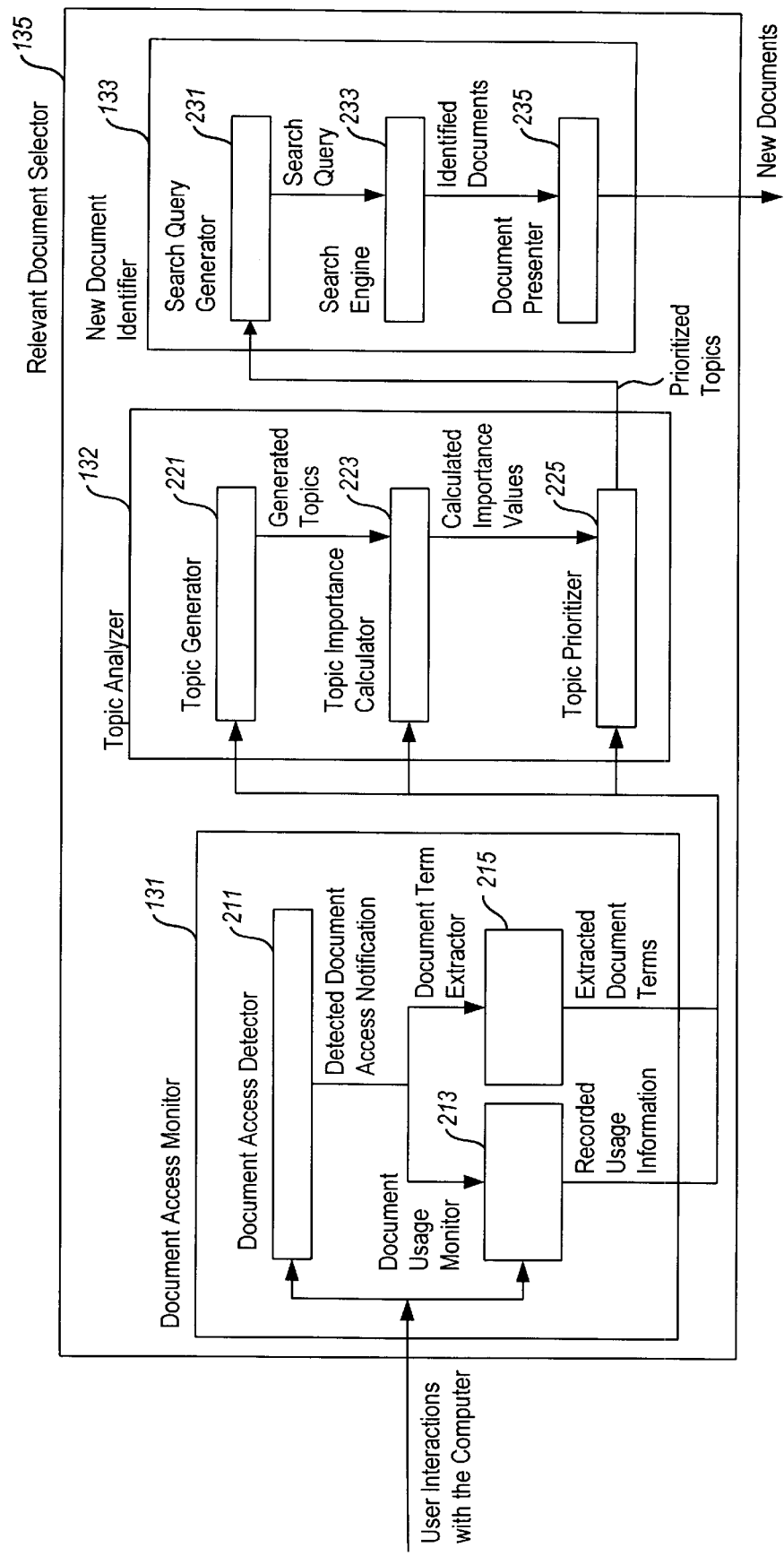
FIG. 2 is a block diagram illustrating the contents and information flow of the Relevant Document Selector.

FIG. 2 is a block diagram showing the components and the information flow of the RDS system 135. The RDS system comprises the Document Access Monitor component 131, the Topic Analyzer component 132, and the New Document Identifier component 133. The Document Access Monitor comprises the Document Access Detector component 211, the Document Usage Monitor component 213, and the Document Term Extractor component 215. The Topic Analyzer comprises the Topic Generator component 221, the Topic Importance Calculator component 223, and the Topic Prioritizer component 225'. The New Document Identifier comprises the Search Query Generator component 231, the search engine component 233, and the Document Presenter component 235.

The RDS system receives notifications of user interactions with the computer system, and outputs new documents that may be of interest to the user without the need for the user to specify topics of interest or disinterest. User interactions with a computer system can include a variety of types of actions, including any interaction of the user with a device capable of providing input to the computer system, as well as any modification of the physical computer system configuration. In personal computer systems, most if not all of these user interactions can be detected by the computer system. For example, personal computer systems typically include a keyboard and a mouse. Any data received by the computer system from such an input device will be transmitted via the port to which the input device is attached, and thus can be detected. Similarly, inserting a disk in a computer system disk drive or removing an installed device are user interactions which the computer system may be able to detect. In one embodiment, any detected interaction can be sent to the RDS system. In an alternate embodiment, some types of detected interactions may not be communicated to the RDS system if they are sufficiently unrelated to user interactions with documents. For example, if a user toggles the 'Caps Lock' key on their keyboard, this interaction may not be of sufficient interest to notify the RDS system. Similarly, moving the mouse pointer on the screen without depressing a mouse key may not be sufficiently interesting.

When the RDS system receives user interaction notifications, they are first sent to the Document Access Monitor 131 which then routs them to the Document Access Detector 211 and the Document Usage Monitor 213. The Document Access Detector 211 analyzes the user interactions and determines if they are related to the access of a computer document. For example, a user could type the name of a document to access it, or could select the window of a document that was previously opened but is currently inactive. Both of these interactions cart indicate the beginning of a period of document access during which various user interactions with the document can occur. Similarly, scrolling the window in which a document is currently displayed, selecting a portion of the document contents, or adding contents to a document can indicate continued interaction with a document and are thus related to document access. Alternately, a computer user may interact with the computer but not access a computer document, such as when the user is entering a password or performing a backup of a storage device.

When an interaction related to the access of a document is detected, the Document Access Detector 211 notifies the Document Usage Monitor 213 and the Document Term Extractor 215 of this information. The Document Usage Monitor 213 receives the detected document access notification and the user interactions notifications, and records document usage information for the accessed documents. The document usage information can include information such as the time and duration of accesses, as well as the types of activities in which the user engages (e.g., viewing contents, altering contents, executing an embedded program, and sending information to another user by selecting specified document contents).

The Document Term Extractor 215 receives the detected document access notifications and extracts relevant terms from the contents of the documents that are accessed. In one embodiment, the detected document access notifications indicate only that a document is being accessed by the user, and the Document Term Extractor 215 accesses the document to ascertain its contents. In another embodiment, the detected document access notifications not only indicate that a document is being accessed, but also include the document contents that are being accessed. Typically, only relevant terms are extracted from the document contents, with relevance measured by the degree of relation between a term and the contents. Various methods for identifying relevant terms are known in the art. Some methods extract and measure the relevance of every term in the contents of a document, while others attempt to identify only the most relevant terms. For example, all words in a document name or title may be determined to be relevant. Alternately, if a document contained terms that indicated formatting information for the display of the document or noise terms (e.g., "the" or "and"), such terms would be unlikely to be relevant terms. In addition, the relevant terms that are extracted can include not only text, but also other types of information. For example, an image that is part of a document could be extracted as a relevant term. Alternately, the contents of the image could be analysed and various textual terms that are related to the image contents could be extracted as relevant terms. Additional discussion of term relevance can be found later in conjunction with FIG. 8.

After usage information is recorded and relevant terms are extracted, the Document Access Monitor 131 then forwards the recorded usage information and the extracted document terms to the Topic Analyzer 132. The Topic Generator 221 first receives the information from the Document Access Monitor 131, end generates topics related to areas of interest to the computer user. The Topic Generator 221 begins by generating related terms for the extracted terms. Related terms can be generated in a variety of manners, including analogous terms and associated terms. Analogous terms are related to extracted terms by virtue of similar meanings. Associated terms are related to extracted terms; due to repeated usage of the terms together in a manner that demonstrates a relationship. For example, consider the term "bat." Analogous terms might include "stick," "mallet," "to strike." and "a flying mammal"). Associated terms might include "Count Dracula," "Pete Rose," and "pine tar"). Those skilled in the art will appreciate that related terms can be generated in a variety of ways, including the use of a thesaurus or the use of empirical testing to determine how terms are actually used.

The related terms not only provide additional terms that could be used to broaden a generated search query, but also assist in generating topics that are related to the contents of accessed documents. For example, if an accessed document contained only the term "bat," it would be difficult to determine which meaning of "bat" was of interest to the user. However, if other extracted terms from this or other accessed documents included related terms such as "Count Dracula" or "a flying mammal" but not terms related to baseball, then it is likely that the user is interested in topics related to the mammal but not to the sport. Therefore, after the related terms are generated, the extracted terms are grouped together and used to determine topics of interest to the user. Those skilled in the art will appreciate that this grouping and determination can be performed in a variety of ways.

After the topics are generated, they are then forwarded to the Topic Importance Calculator 223, which also receives the recorded usage information and extracted document terms from the Document Access Monitor 131. The Topic Importance Calculator 223 calculates the importance to the user of each of the extracted terms and generated topics, and forwards the calculated importance values to the Topic Prioritizer 225. Those skilled in the art will appreciate that the importance of a term or topic within a document can be measured in many ways. In one embodiment, each generated topic is associated with at least one extracted term, and the importance of a generated topic is calculated from the importance of the extracted terms that are associated with the generated topic. The topic prioritization process begins by calculating the importance of each extracted term that is associated with a generated topic. The importance values for all of the extracted terms that are associated with a topic are then combined and used to generate the importance of the topic. One method of generating importance values for generated topics is discussed in greater detail in relation to FIG. 10A.

In one embodiment, the factors used to measure term and topic importance include the total time of access, the recentness of the last access, the frequency of access, the location and emphasis of a term or topic in a document's contents, and the relationship of terms or topics to each other. For example the total amount of time spent accessing a term may be calculated by determining the amount of time spent accessing documents whose contents contain the term, or it may be possible to determine and count only the amount of time spent accessing a particular term within a document. In calculating the importance of a term in the contents of a document, a term in the title is likely to be more important than a term in the body of a document. Similarly, terms that are emphasized through means such as highlighting or underlining are likely to be more important than other non-emphasized terms. Other importance measures and other methods of determining the values for the measures can be used, and the importance measures used in one embodiment are discussed in greater detail in relation to FIG. 10A.

After receiving the generated topics and their calculated importance values, the Topic Prioritizer 225 uses this information, the recorded usage information and the extracted document terms to prioritize the generated topics. Those skilled in the art will appreciate that a variety of ways to prioritize topics are possible, including prioritizing topics on the basis of their importance values so that the highest importance values have the highest priority. One method of prioritizing the topics is discussed in greater detail in relation to FIG. 10A. After the generated topics are prioritized, they are then forwarded to the New Document Identifier 133.

When the New Document Identifier 133 receives the prioritized generated topics, the Search Query Generator 231 takes the prioritized topics as input and generates a search query designed to identify additional computer documents related to the generated topics. Those skilled in the art will appreciate that a variety of search queries can be formulated to identify documents related to a given set of topics, and that these different search queries will often identify different groups of documents. For example, a search could be generated to identify only those documents whose contents contain every prioritized generated topic, or instead a search could be generated to identify those documents whose contents contain any prioritized generated topic. The generated search query is forwarded to the Search Engine 233, which uses the search query to perform a search on accessible computer documents. Those skilled in the art will appreciate that a variety of search engines are known in the art, including search engines from companies such as Infoseek, Excite, and Digital Equipment Corporation (DEC). Each search engine has its own rules and syntax for the search queries used by it. Thus, the particular search query that is generated will depend on the search engine to be used and on a determination of which available search query for that engine is most likely to return the desired documents. The generation of search queries is discussed in greater detail in relation to FIG. 10B.

After the Search Engine 233 has performed its search and identified documents related to the search query, the identified documents are forwarded to the Document Presenter 235. The Document Presenter 235 indicates that these documents are potentially of interest to the user, and makes the documents available to the user. Finally, the identified documents are made available by the RDS system to other computer system components.

Figure 3:
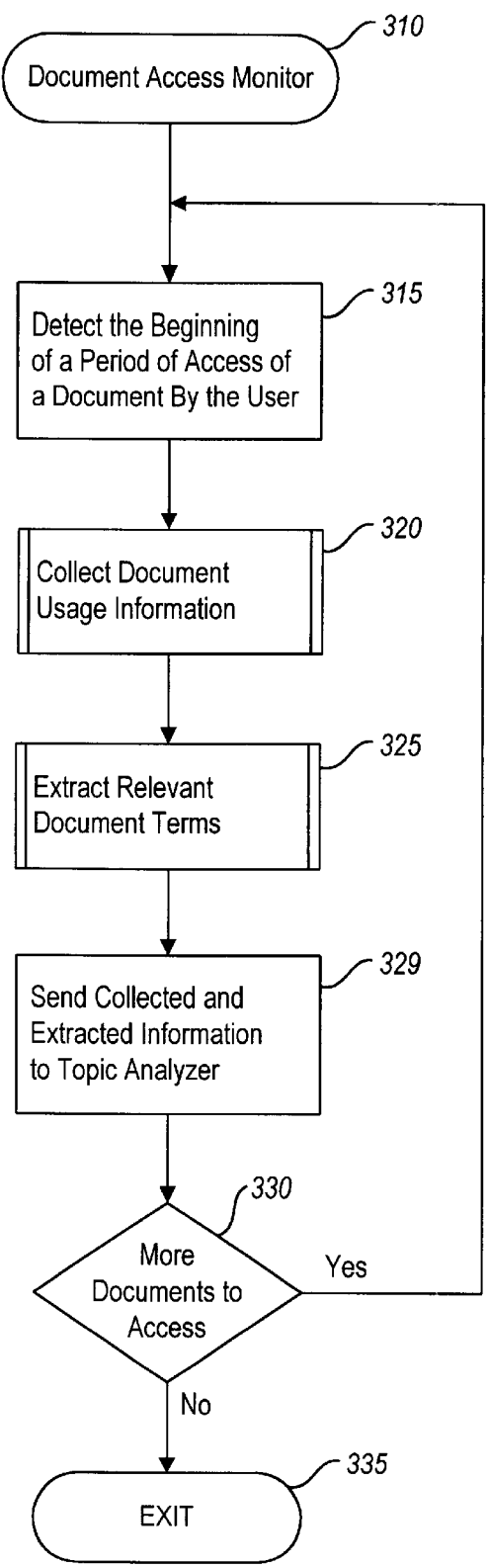
FIG. 3 is a flow diagram of the Document Access Monitor routine.

FIG. 3 is a flow diagram of an implementation of the Document Access Monitor routine 310. The routine monitors the actions of the user to determine when access to a document begins, gathers usage information related to the user's interactions with the accessed documents until access ends, gathers information related to the contents of the documents accessed by the user, and sends the gathered information to the Topic Analyzer routine 605 (illustrated in FIG. 6). In step) 315, the routine receives information about interactions between the user and the computer system and waits until it detects an access of a document, which begins a period of user interaction with the document during which the document is the focus of user attention. In step 320, the routine invokes the Collect Document Usage Information subroutine to collect document usage information for the accessed document, and in step 325, the Extract Relevant Document Terms subroutine is executed to extract relevant terms from the contents of the accessed document. In step 329, the collected and extracted information is sent to the Topic Analyzer routine. In step 330, the routine determines if the monitoring is complete. If not, the routine loops back to step 315 and receives additional information about the user's interactions with the computer system. If so, the routine exits at step 335.

While the steps of the routine are presented in a linear flow, those skilled in the art will appreciate that other alternatives are possible. For example, it is possible for the Document Access Monitor routine 310 to collect document usage information as the document is being accessed and to delay the extraction of relevant terms until a predefined time (e.g., hourly). Also, a period of access with one computer document may be ended by the beginning of a period of access with another document. Alternatively, the routine may extract the relevant terms as the document is accessed but send information in step 329 only periodically, so that step 329 may be performed only after information for a number of accessed documents has been collected and extracted. It is also possible for the collection of document usage information and the extraction of relevant terms to occur concurrently.

Figure 4:
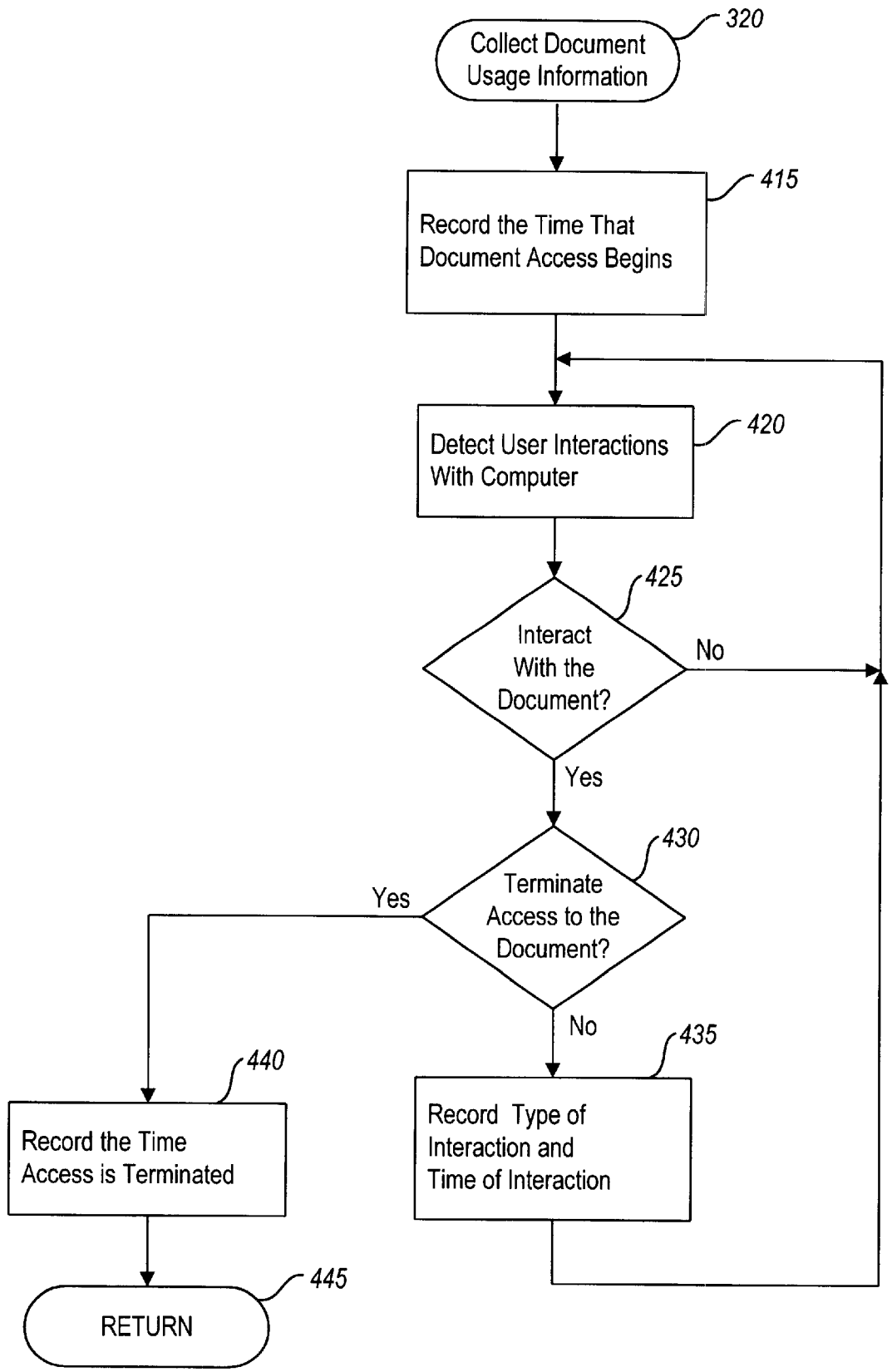
FIG. 4 is a flow diagram of the Collect Document Usage Information subroutine.

FIG. 4 is a flow diagram of an implementation of the Collect Document Usage Information subroutine 320. The subroutine is invoked when a document access is detected. It monitors user interactions with the computer to identify interactions related to the accessed document and records information about these identified interactions. In step 415, the subroutine records the time when the period of document access begins. In step 420, the subroutine detects a user interaction with the computer system. In step 425, the subroutine determines if the detected user interaction involved an interaction with the accessed document. If not, the subroutine loops back to step 420, and continues to detect user interactions with the computer system. If a document interaction is identified in step 425, the subroutine continues to step 430 where it determines if the detected interaction has terminated access to the document (i.e., the document is closed or the access is terminated in another manner, such as beginning a period of access with another document). If access has not been terminated, the subroutine continues to step 435, where the type of document interaction and the time of the interaction is recorded. The subroutine then loops back to step 420 to detect additional user interactions with the computer system. If access to the document was terminated in step 430, then the subroutine proceeds to step 440 where the time of document access termination is recorded, and the subroutine executes a return at step 445. Those skilled in the art will appreciate that user interactions with a document can be determined in a variety of ways, and that a variety of types of user interactions can be recorded.

Figure 5:
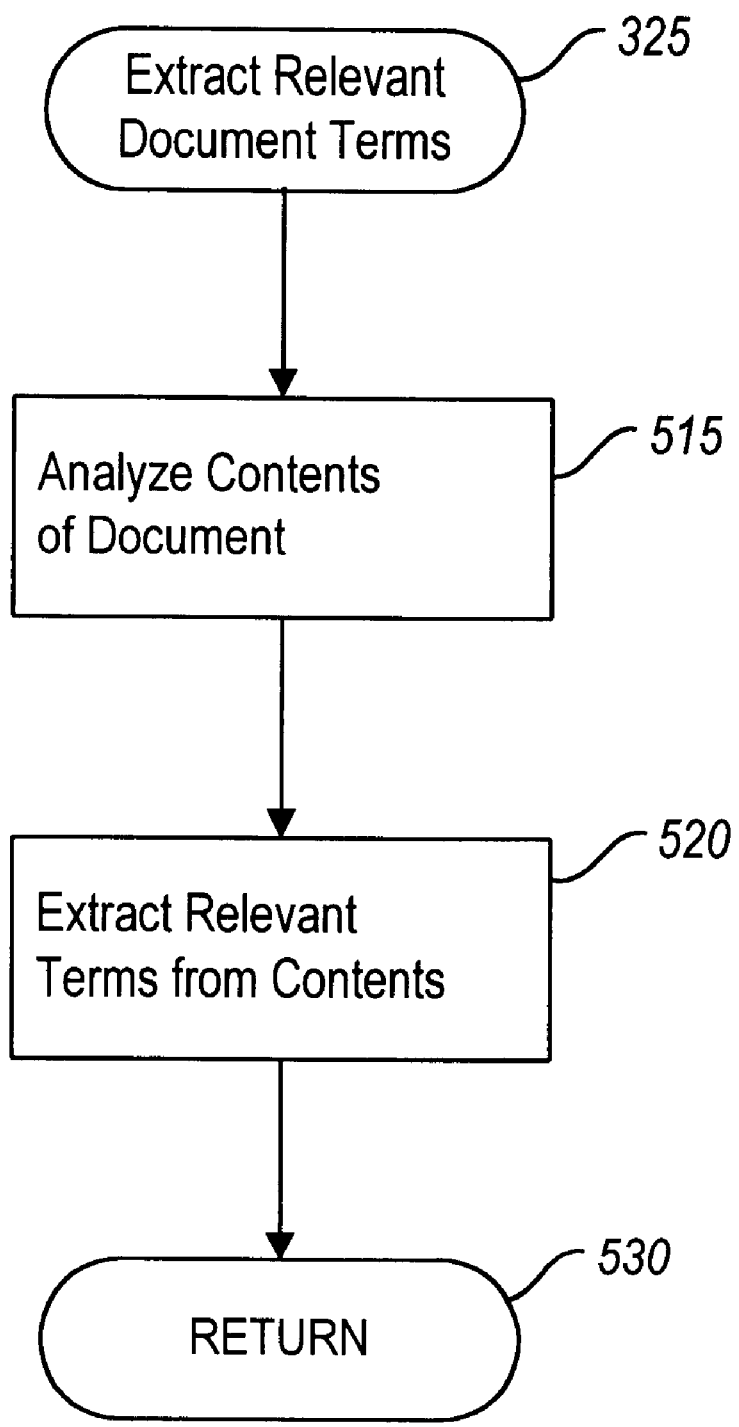
FIG. 5 is a flow diagram of the Extract Relevant Document Terms subroutine.

FIG. 5 is a flow diagram of an implementation of the Extract Relevant Document Terms subroutine 325. The subroutine is invoked when the end of a document access is detected. It analyzes the contents of the accessed documents and extracts relevant terms from the contents. In step 515, the subroutine analyzes the contents of the accessed document. The subroutine continues to step 520 where relevant terms are extracted from the analyzed contents. In step 530 the subroutine executes a return. Those skilled in the art will appreciate that relevant terms can be generated in a variety of ways, and can be extracted from the contents of the entire document or only from the content of the portions of the document with which the user interacts.

Figure 6:
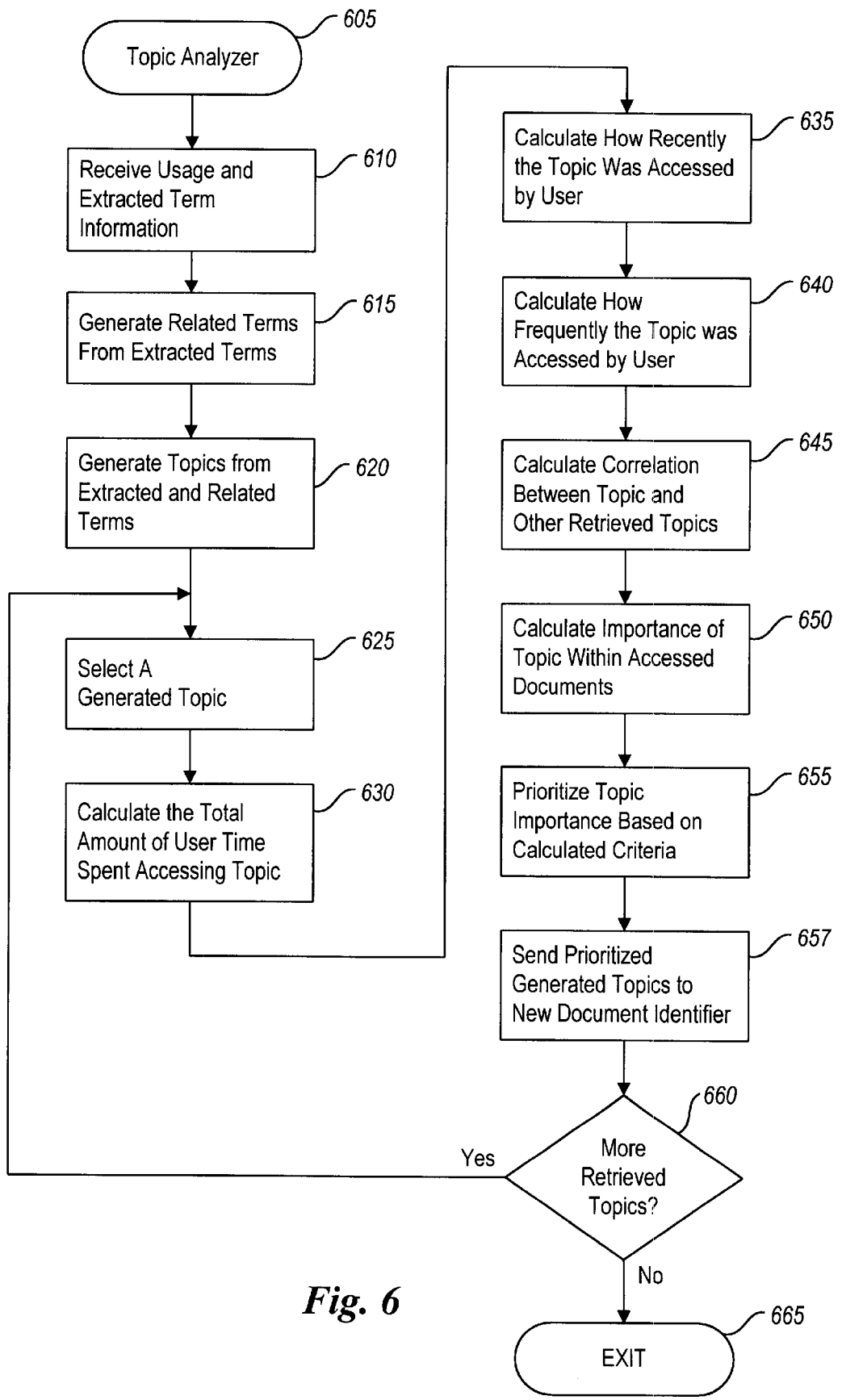
FIG. 6 is a flow diagram of the Topic Analyzer routine.

FIG. 6 is a flow diagram of an implementation of the Topic Analyzer routine 605. The routine receives document usage information and extracted terms, generates topics of user interest, calculates the importance of the topics based on measures of user interest, and prioritizes the topics based on the calculated values. The routine begins at step 610 where it receives document usage information and extracted terms from the Document Access Monitor routine 310 (illustrated in FIG. 3). In step 615, terms that are related to the extracted terms are generated. After related terms are generated, the subroutine continues to step 620 where topics of user interest are generated from the extracted and related terms. In steps 625–660 the routine loops, calculating the importance of each topic based on various measures of user interest. In step 625, the routine selects a generated topic. The routine continues at step 630, where the total amount of user time spent accessing the selected topic is calculated. In step 635, the routine calculates how recently the topic was accessed by the user. In step 640, the routine calculates how frequently the topic was accessed by the user during some previous time period, and in step 645 the routine calculates a correlation between the topic and other retrieved topics to determine if different topics are related to each other. In step 650, the importance of a topic within a document is calculated, using information such as topic location and presentation within the document to determine importance. In step 655, the routine prioritizes the importance of the topic in relation to other topics based on the various calculated criteria. In step 657, the routine sends prioritized generated topics to the New Document Identifier routine 710 (illustrated in FIG. 7). In step 660. it is determined if there are more generated topics to be selected. If so, the routine loops back to step 625 and selects the next generated topic, and if there are no more generated topics, then the routine exits at step 665.

Those skilled in the art will appreciate that topics of user interest can be generated in a variety of ways, that the importance of a topic can be calculated in a variety of ways (i.e., using of a variety of importance measures), and that the topics can be prioritized in a variety of ways. In addition, while the steps of the routine are presented in a linear flow, those skilled in the art will appreciate that other alternatives are possible. In particular, the routine may prioritize topics in step 655 only periodically, and may send information in step 657 only periodically. For example, if the prioritization of topics is best performed relative to other topics, the routine may wait until topic importance measures have been calculated for all topics before prioritizing the topics. Similarly, step 657 will typically be performed only after prioritization has occurred in step 655, and may be performed only after the Topic Analyzer routine has been performed a number of times. Importance measures can also be calculated in a variety of orders, including simultaneously.

Figure 7:
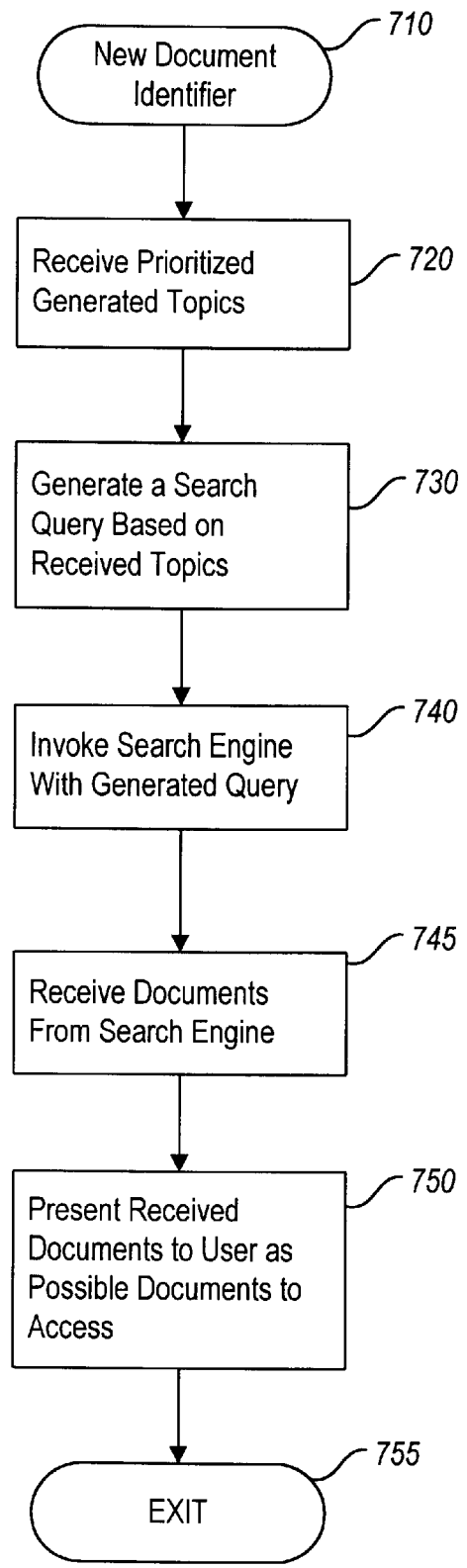
FIG. 7 is a flow diagram of the New Document Identifier routine.

FIG. 7 is a flow diagram of an implementation of the New Document Identifier routine 710. The routine receives prioritized generated topics of user interest, generates a search query designed to identify documents related to the prioritized generated topics, requests that a search be performed with the generated search query, and presents resulting documents to the user as possible documents for the user to access. The routine begins at step 720 where it receives prioritized generated topics from the Topic Analyzer routine 605 (illustrated in FIG. 6). In step 730, the routine generates a search query based on the prioritized generated topics of user interest. In step 740, the routine invokes a search engine and passes it the generated query. In step 745, the routine receives documents from the search engine that are the result of the performed search. In step 750, the received documents are presented to the user as possible documents for the user to access in the future, and the routine exits at step 755.

Those skilled in the art will appreciate that a search query can be generated in a variety of ways, including varying syntax to reflect a particular search engine and varying the topics in the search query in an attempt to identify different groups of documents. In addition, while the steps of the routine are presented in a linear flow, those skilled in the art will appreciate that other alternatives are possible. In particular, the routine may execute steps 730–755 only when the user expresses an interest in selecting additional documents. In this scenario, prioritized generated topics may be received in step 720, and stored until they are needed. In addition, step 720 could receive multiple groups of prioritized generated topics before step 730 is executed.

FIG. 8 shows illustrative examples of accessed documents, of document usage information, and of extracted terms from the accessed documents. Three accessed documents are shown, documents 810, 840, and 870, all of which contain only textual information. Three sets of document usage information for a single user are also shown, those being usage information 820, 850, and 880. Usage information 820 corresponds to document 810, usage information 851) corresponds to document 840, and usage information 880 corresponds to document 870. There are also three sets of extracted terms shown, those being extracted terms 830 which corresponds to document 810, extracted terms 860 which corresponds to document 840, and extracted terms 890 which corresponds to document 870. Document 810 is entitled "President Clinton Announces New Standards," and contains document contents related to new educational testing standards proposed by President Clinton. Document 810 was accessed and viewed three different times over two days for a total of 155 minutes, as shown in document usage information 820. On day August 17, document 810 was accessed and viewed from 10:50–11:30 and from 1:30–1:55.

On day August 19, document 810 was accessed and viewed from 4:05–5:35. Relevant terms extracted from document 810 include "President Clinton," "educational system," "standards," "testing," "teachers," and "broken." Those skilled in the art will appreciate that different terms could be selected as relevant terms, including the selection of all or none of the terms as relevant terms. Document 840 is entitled "U.S. to Send Aid to Latin America," and contains contents related to proposed assistance to Latin American countries. Document 840 was accessed and viewed a total of two times on two separate days for a total of 25 minutes, including day August 17 from 11:30–11:45 and day August 18 from 2:15–2:25. The extracted terms from is document 840 include "U.S.," "aid," "Latin America," "White House." "foreign policy," "medical relief." "environmental protection," "schools," "President Clinton," "Hillary Clinton," and "standards." Document 870 is entitled "Schools Reappear in Puget Sound," and contains comments related to schools of fish appearing in the Puget Sound area. This document was accessed and viewed one time on August 17 for a total of two minutes from 11:50–11:52. Relevant terms extracted from document 870 includes "schools," "Puget Sound," "fish," and "fishermen." While each of the illustrated documents was opened, viewed, and then closed, those skilled in the art will appreciate that other types of user activities are possible (e.g., modifying document contents, executing a program embedded in the contents, etc.).

Figure 9:
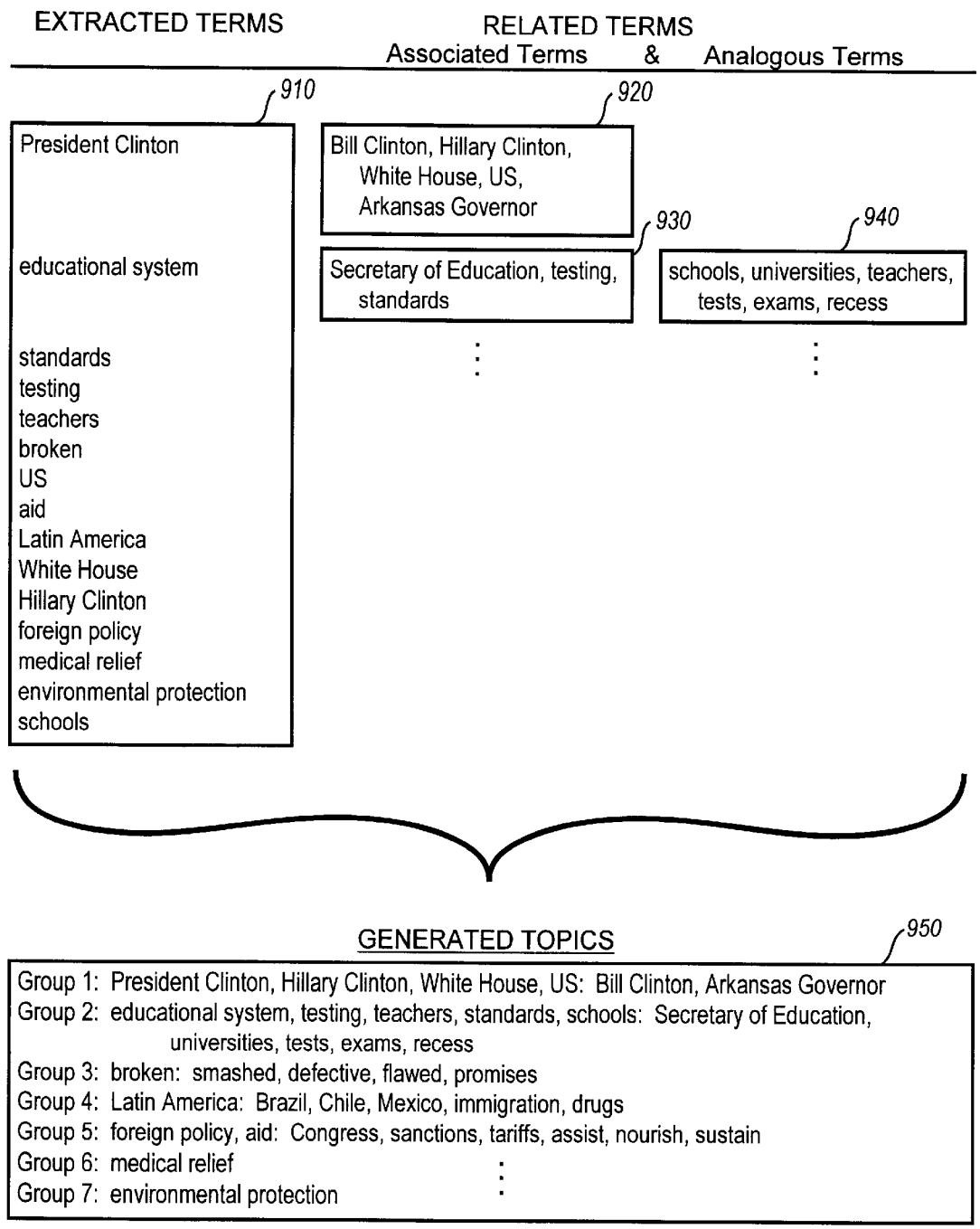
FIG. 9 is a diagram illustrating related terms that correspond to extracted terms, and illustrating the generation of topics from those terms.

FIG. 9 shows illustrative related terms that are generated for the extracted terms, and illustrative topics generated from the extracted and related terms. Extracted terms 910, associated terms 920 and 930, analogous terms 940 and generated topics 950 are shown. Extracted terms 910 includes the terms 30 "President Clinton," "educational system," "standards" "testing," "teachers," "broken," "U.S.," "aid," "Latin America," "White House," "Hillary Clinton," "foreign policy," "medical relief," "environmental protection," and "schools." Associated terms 920 includes the terms "Bill Clinton," "Hillary Clinton," "White House," "U.S.," and "Arkansas Governor," and associated terms 930 includes "Secretary of Education," "testing," and "standards." Associated terms 920 is associated with the first extracted term, "President Clinton," and associated terms 930 is associated with the second extracted term, "educational system." There is also one set of analogous terms shown, analogous terms 940. The terms in analogous terms 940 includes "schools," "universities," "teachers," "tests," "exams," and "recess," and are analogous to the second extracted term, "educational system."

Thus, there are two types of related terms shown, those being associated terms and analogous terms. For example, consider the first extracted term, "President Clinton." Through past documents with contents related to President Clinton, terms such as "Bill Clinton," "Hillary Clinton," "White House," and others have become associated with the term "President Clinton." There are no analogous terms for the term "President Clinton" shown. The second extracted term is "educational system." Analogous terms for educational system include "schools," "universities," "teachers," "tests," and other terms. These terms are analogous due to their similar meanings and their defined relationships with the extracted term "educational system." Associated terms for the extracted term "educational system" may include terms such as "Secretary of Education," "testing," and "standards," if past documents have discussed those terms in a manner associated with the term "educational system." Related terms will be generated for all of the extracted terms in a similar manner.

After the related terms are generated, the extracted and related terms are used to create the generated topics 950. Generated topics 950 comprises seven groups, with Group 1 including the extracted terms "President Clinton," "Hillary Clinton," "White House," and "U.S.," as well as related terms "Bill Clinton" and "Arkansas Governor." Group 2 includes the extracted terms of "educational system," "testing," "teachers," "standards," and "schools," as well as the related terms of "Secretary of Education," "universities," "tests," "exams," and "recess." Groups 3–7 contain similar sets of extracted and related terms. Note that a term can itself be an extracted term and also be a related term for other extracted terms, such as the terms "White House" and "Hillary Clinton." One method for choosing extracted terms to group together, such as the extracted terms in Group 1, involves grouping extracted terms together if one of the extracted terms is also a related term for another extracted term in the group. Those skilled in the art will appreciate that other methods of generating topics related to document contents are possible. These may include methods that do not use extracted terms, other methods of grouping terms, topics that include a single term, or generating a new term that is broad enough to include multiple extracted and related terms.

FIG. 10A shows illustrative importance calculations for terms and topics, topic prioritization! and FIG. 10B shows examples of possible generated search queries from prioritized generated topics. Topic Table 1010 shows various topics along the left side of the table, various topic important measures in the middle of the table, and a topic prioritization scheme on the right side of the table. Search queries 1050, 1060, 1070, 1080 and 1090 are examples of possible search queries generated from the prioritized topics. In one preferred implementation, the priority of the generated topics is based on the calculated importance of the extracted terms within the generated topic, and does not depend on the related terms within the generated topic. Therefore, the extracted terms for each group are also displayed along the left side of the table. For example, generated topic Group 1 is shown with importance calculations for the extracted terms "President Clinton," "Hillary Clinton," "White House," and "U.S.," but not for the related terms such as "Bill Clinton," etc.

The topic importance measures displayed in Topic Table 1010 include the number of documents that contain the extracted term, the length of time spent accessing an extracted term, the last access of the extracted term, the frequency of access of the extracted term, the average repetition of the extracted term in the accessed documents that contain that term, and the importance in the document text of the extracted term for those accessed documents that contain the extracted term. The values in the table correspond to the example documents 810, 840 and 870 and their corresponding usage patterns in FIG. 8. For the purpose of calculating the table values, the table was generated on day August 20 and considered the usage information for days August 17–August 19. In addition, there is an access threshold in one preferred embodiment such that at least 5 minutes of document access time is required before an accessed document is counted for the purpose of importance calculations and for generating topics. Document 870 will not be used in the calculations, since it was accessed only one time for two minutes, thus failing to meet the required threshold. The document usage patterns are illustrative of a user interested in educational standards, who assumed that document 870 was related to educational standards based on the document 870 title of "Schools Reappear in Puget Sound."

However, upon accessing the document, the computer user quickly determined that the term "schools" in the title refers to schools of fish rather than to educational standards, and expressed a disinterest in this accessed document by accessing it for only one time for only two minutes. Due to this disinterest, the document is not used in the importance calculations.

Taking as an example the extracted term "President Clinton" in the generated topic Group 1, it is shown that the term "President Clinton" is present in two of the accessed documents, those being document 810 and document 840 (shown on FIG. 8). In addition, the computer user has spent 180 minutes accessing documents that contain the term "President Clinton," with the last access of a document containing the term "President Clinton" being one day ago (based on the access of document 810 on day August 19), a frequency of access of documents that contain the extracted term of 5/3 (based on 5 accesses over the previous three days, since document 810 was accessed three times and document 840 was accessed two times), an average repetition of the extracted term "President Clinton" in the accessed documents that contain it of 2.5 times per document (based on three occurrences of the term "President Clinton" in the accessed document 810 and two occurrences of the term "President Clinton" in the accessed document 840), and an importance of the term "President Clinton" in the accessed documents of 4 on a scale of 1–5. The importance of a term in the document text is based on taking the highest importance of the extracted term in any of the accessed documents, and giving a ranking of "2" to normal text, a ranking of "1" to text contained in a footnote, a ranking of "3" to text that is emphasized (such as being highlighted or italicized), a "4" to text that is present in the title of a document, and a "5" to text that is both in a title and emphasized. Those skilled in the art will appreciate that other topic important measures can be used, and that the method for generating a particular calculated importance value can vary.

As a second example, consider the extracted term "schools" in the generated topic Group 2. The extracted term "schools" is shown as being contained in one accessed document, despite the fact that extracted term "schools" is present in both document 840 and document 870 (since document 870 is being ignored). Moving to the next topic importance measure, the length of time spent accessing documents containing the extracted term "schools" is shown as 25 minutes, corresponding to the amount of time accessing document 840 and ignoring the amount of time spent accessing 870. The last access of a document containing the term "schools" is shown to be two days, since document 840 was accessed on 8/18. The frequency of access of documents containing the extracted term "schools" per day is 2/3, corresponding to accesses of document 840 on August 17 and August 18, and ignoring the access of document 870 on day August 17. The average repetition of the extracted term "schools" in the accessed documents is shown as 1, based on a single occurrence of the term "schools" in the document 840. Note that although document 810 refers to standards for educational testing and to an educational system, it does not contain the extracted term "schools" and thus is not included in the calculations for this term. Instead, the importance of the term "educational system" will be calculated separately, and then combined with the importance of the term "schools" to determine the importance of Group 2. The importance in the text of the extracted term "schools" in the documents that contain it is shown as 2, corresponding to the status of the term "schools" as normal text in document 840. The values for the other extracted terms are calculated in a similar manner.

The overall importance measure on the right side of Topic Table 1010 is used to prioritize the generated topics. The prioritization process begins by calculating the overall importance of each extracted term. Those skilled in the art will appreciate that there are many ways to combine such calculated importance measures to reach a single overall importance value, including the use of weighted measures and the use of correlations between a term and other extracted terms. In one preferred embodiment, the calculated value for each topic importance measure is scaled to a score between 1 and 5, and the average of the scaled values for all the topic important measures is then calculated to be the overall importance of the extracted term.

For example, considering the extracted term "President Clinton," it has a calculated importance value of 2 for the measure, based on the number of documents that contain the term. Since the maximum value in this measure for any extracted term is 2, the scaled value for the extracted term "President Clinton" is calculated as the actual value (i.e., 2) divided by the maximum value for the column (i.e., 2) multiplied by 5 (i.e., (actual value/maximum value)*5, or (2/2)*5). This will result in a scaled value of 5 for the extracted term "President Clinton" in the topic importance measure of number of documents that contain the accessed term. In a similar manner, the scaled value for the extracted term "President Clinton" for the topic importance measure of "length of time spent accessing" will also be 5, based on 180/180*5. The scaled value for the "last access" topic importance measure will be 2.5, based on the actual value of 1 divided by the maximum value in the column of 2 multiplied by 5 (if the most recent accesses are given the highest importance values, the scaled value could instead be 5 since the maximum value in the column under that scheme would be 1). The scaled value for the "frequency of access" importance measure will be 5, based on 5/3 divided by 5/3 times 5. The scaled value for the "average repetition in documents that contain" measure will be 5 based on 2.5 divided by 2.5 times 5. The scaled value for the extracted term "President Clinton" in the "important in text of documents that contain" measure will be 4 (since this measure is already scaled between 1 to 5, it is not necessary to rescale the measure). The average of the scaled values 5, 5, 2.5, 5, 5, and 4 is calculated, resulting in the value of 4.4 in the overall importance measure column for the extracted term "President Clinton." The overall importance value for each of the extracted terms is calculated in a similar manner.

It is next necessary to calculate an overall importance value for each generated topic. Considering the generated topic Group 3, the only extracted term for Group 3 has an overall importance value of 2.7, and thus generated topic Group 3 is also given an overall importance value of 2.7. Considering generated topic Group 1, the generated topic contains 3 extracted terms with overall importance values of 4.4, 2.4, and 2.7. Merely taking the average of these three overall importance values would result in an average value of 3.2. However, one preferred embodiment increases this calculated average if there is more than one extracted term in the generated topic. Here the average of 3.2 is increased by 1/10 for each extracted term when there is more than one, giving an additional 3/10 to the overall importance value for the generated topic Group 1 and resulting in an overall importance calculated value of 3.5. After calculating the importance values of each generated topic in a like manner, the highest priority generated topic is generated topic Group 1 with an overall importance value of 3.5. Moving to successively lower overall importance values, the remaining shown generated topics are prioritized in the order of generated topic Group 2, generated topic Group 4 and generated topic Group 3 (not shown in prioritized order in Topic Table 1010).

These prioritized topics are next used to generate possible search queries. Those skilled in the art will appreciate that the particular syntax of a search query and the features allowed in a search query will depend on the particular search engine used. Search queries 1050–1090 in FIG. 10B illustrate possible queries based on the prioritized calculated topics. Possible search queries include a search for any Group 1 term (shown in generated search query 1050), any two Group 1 terms (shown in generated search query 1060), the most common Group 1 term near any Group 2 term (shown in generated search query 1070), any Group 1 term and any Group 2 term (shown in generated search query 1080) and any term from each of the generated topics (shown in generated search query 1090). Generated search query 1050 illustrates that although one preferred embodiment prioritized topics based only on extracted terms, the generated search query includes both extracted terms and related terms. Generated search query 60 demonstrates that the most common Group 1 term based on the average repetition in the accessed documents is the term "President Clinton." The search query can specify! an exact relationship of that term to other terms (such as being within ten words of other terms), or can allow the search engine to determine if other terms are "near" the term. These generated search queries use a basic form of Boolean logic including AND terms OR terms and NOT terms that has been modified with additional terms such as "ANY-2-OF" in generated search query 1060, and "NEAR" and "WITHIN-10-WORDS-OF" in generated search query 1070.

In one embodiment of the present invention, the search for new documents is conducted within a large set of accessible documents whose contents vary only slightly or not at all. In this situation, an index of the contents of these documents can be created, and the documents can later be retrieved based on the index. In other embodiments, the present invention can be used to locate other types of documents. For example, it is common to have a live document feed, such as a live news feed, in which various documents are made accessible for selection for only a short time each, and if not selected, they will become inaccessible. The determined topics of interest and generated search queries could be used as a means of identifying documents from a live document feed that are likely to be of interest to the user, and those documents could be selected from the live document feed so that they remain accessible to the user. In another embodiment, the present invention can be used to prioritize a given set of documents rather than to identify documents of interest. For example, many users receive documents sent from other users (such as electronic mail or e-mail), most or all of which will be accessed by the user at some point. The present invention can be used to prioritize a group of received e-mail documents, facilitating the access by the user of the documents in the order which is most useful to the user. In this embodiment, the generated search query can be used to identify e-mail documents which contain contents that are of interest to the user.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A method for identifying computer documents of interest to a user of a computer without specification by the user of topics of interest, the computer having access to computer documents, each computer document having contents related to one or more topics, the computer having a computer document search engine for receiving one or more search topics and for identifying accessible computer documents whose contents are related to the search topics, the method comprising:

for each of a plurality of computer documents, receiving an indication from the user to display the computer document;

monitoring interactions by the user with the displayed computer document; and recording information related to the monitored user interactions; and without user intervention, for each of the displayed computer documents, analyzing the contents of the computer document to identify topics related to the contents;

generating topics of interest to the user from the recorded interactions information and the identified topics such that the generated topics of interest to the user are discarded if monitored user interactions with the displayed computer documents whose contents are related to the topic do not reach a threshold level;

prioritizing the generated topics based on degree of interest to the user;

using the computer document search engine to identify accessible computer documents whose contents are related to the prioritized generated topics; and automatically presenting the identified computer documents to the user for possible display such that identified computer documents with contents related to higher priority generated topics are presented before identified computer documents with contents related to priority generated topics.

2. The method of claim 1 wherein the degree of interest to the user is based on analyzing the recorded interactions information to measure user interaction with displayed computer documents whose contents are related to the topic, and on analyzing the contents of displayed computer documents and determining the congruity of the topic to the analyzed contents.

3. The method of claim 1 wherein the computer can communicate with other computers, wherein the accessible computer documents are located on the other computers, and wherein the computer document search engine identifies the accessible computer documents by analyzing the contents of accessible computer documents;

determining topics related to the analyzed contents, creating an index associating determined topics with accessible computer documents whose contents are related to the determined topics;

after creating the index, receiving prioritized generated topics;

selecting determined topics that are related to the highest priority received generated topics; and using the created index to identify accessible computer documents associated with the selected determined topics.

4. A method for identifying computer documents of interest to a user of a computer without specification by the user of topics of interest, the computer living access to computer documents, each computer document having contents related to one or more topics, the computer having a computer document search engine for receiving one or more search topics and for identifying accessible computer documents whose contents are related to the search topics, the method comprising:

for each of a plurality of computer documents,
receiving an indication from the user to display the computer document;
displaying to the user the indicated computer document;
monitoring interactions by the user with the displayed computer document;
recording information related to the monitored user interactions; and
identifying topics related to the contents of the displayed computer document by analyzing the contents, wherein each identified topic is a term present in the contents of the displayed computer document to which the identified topic is related; and without user intervention,
generating topics of interest to the user from the recorded interactions information and the identified topics such that the generated topics of interest to the user are discarded if monitored user interactions with the displayed computer documents whose contents are related to the topic do not reach a threshold level;
prioritizing the generated topics based on degree of interest to the user;
using the computer document search engine to identify accessible computer documents whose contents are related to the prioritized generated topics; and
presenting the identified computer documents to the user for possible display,
whereby identified computer documents with contents related to higher priority generated topics are presented before identified computer documents with contents related to lower priority generated topics.

5. A computer-implemented method for locating computer data of interest to a user, the method comprising:
monitoring interactions of the user with a group of computer data; and
without user intervention, analyzing contents of the group of computer data to identify topics related to the contents; using the monitored user interactions to determine at least one topic of user interest that is related to the identified topic;
determining the identified topic of most interest to the user based on the monitored user interactions that includes prioritizing the identified topics based on the monitored user interactions;
establishing a priority level; and
selecting the identified topics with priorities above the established priority level to be the determined topics of user interest;
generating topics of interest to the user from the recorded interactions information and the identified topics such that the generated topics of interest to the user are discarded if monitored user interactions with the displayed computer documents whose contents are related to the topic do not reach a threshold level;
locating additional groups of computer data that are related to the determined topic which includes analyzing designated groups of computer data to determine if they are related to the determined topic; and
choosing related designated groups of computer data to be the located additional groups of computer data so that the chosen groups of computer data will be presented to the user before other groups of computer data.; and
selecting the located additional groups of computer data for the user.

6. The method of claim 5 wherein the interactions of the user with the group of computer data are monitored by a computer other than the user's computer, and wherein the other computer sends monitored user interactions information to the user's computer.

7. The method of claim 5 wherein a group of computer data is a computer document stored on a computer, wherein the user's computer communicates with other computers via a computer network, and wherein locating additional groups of computer data involves using a computer document search engine to search for accessible computer documents located on any device on the computer network.

8. The method of claim 5 wherein a group of computer data is available for a limited time, and wherein locating additional groups of computer data comprises analyzing the group of computer data while it is available to determine if the data is related to the determined topic.

9. A method for identifying computer documents with contents of interest to a user of a computer, the method comprising:

for each of a plurality of computer documents selected by the user,
monitoring user interactions with the computer document; and
identifying additional computer documents without user intervention by,
identifying topics related to the contents of the plurality of selected computer documents;
generating search topics from the identified topics and the monitored user interactions such that the generated topics of interest to the user are discarded if monitored user interactions with the displayed computer documents whose contents are related to the topic do not reach a threshold level;
for each of the generated search topics, measuring the pertinence of the topic to the contents of the selected computer documents; and
using the monitored user interactions to determine a level of user propensity to interact with computer documents whose contents are related to the topic; and
identifying computer documents with contents related to the generated search topics, the identified computer documents in an order based on a level of user interest in the topics as indicated by the measured pertinence and the determined levels of user propensity.

10. The method of claim 9 wherein determining a level of user propensity to interact with computer documents whose contents are related to the topic includes:
measuring a cumulative amount of time of user interaction with selected computer documents whose contents are related to the topic;
measuring a frequency of user interaction with selected computer documents whose contents are related to the topic; and
measuring a recentness of user interaction with selected computer documents whose contents are related to the topic.

11. The method of claim 9 wherein measuring the pertinence of the topic to the contents of the selected computer documents includes:

measuring the number of selected computer documents whose contents are related to the topic;

measuring, a degree of association between the topic and the contents of each selected computer document; and measuring an amount of repetition of the topic in the contents of the selected computer documents.

12. A method for identifying computer documents with contents of interest to a user of a computer, the method comprising:

for each of a plurality of computer documents selected by the user, monitoring user interactions with the computer document; and identifying topics related to the contents of the computer document; and identifying additional computer documents without user intervention by, generating search topics from the identified topics and the monitored user interactions such that the generated search topics are discarded if monitored user interactions with the computer documents whose contents are related to the topic do not reach a threshold level;

for each of the generated search topics, measuring the pertinence of the topic to the contents of the selected computer documents; and using the monitored user interactions to determine a level of user propensity to interact with computer documents whose contents are related to the topic; and identifying computer documents with contents related to the generated search topics in an order based on a level of user interest in the topics as indicated by the measured pertinences and the determined levels of user propensity.

13. The method of claim 12 wherein the interactions of the user with the group of computer data are monitored by a computer other than the user's computer, and wherein the other computer sends monitored user interactions information to the user's computer.

14. The method of claim 12 wherein the identifying of the computer documents with contents related to the generated search topics includes:

locating accessible computer documents with contents related to the generated search topics; and ordering the located documents based on a level of user interest in the contents of the documents as indicated by the measured pertinences and the determined levels of user propensity.

15. The method of claim 12 wherein computer documents that are available to be identified as having contents related to the generated search topics are available for only a limited time, and wherein the identifying of those computer documents includes analyzing the contents of those computer documents while they are available in order to determine if the contents are related to the determined topics of user interests.

16. The method of claim 12 wherein a plurality of computer documents have been designated to be interacted with by the user, and wherein the identifying of the computer documents with contents related to the generated search topics includes:

analyzing contents of the designated computer documents to determine if the contents are related to the generated search topics;

choosing the designated computer documents with related contents as the identified computer documents; and presenting the chosen computer documents to the user before other designated computer documents.

17. The method of claim 12 wherein the determining of the level of user propensity to interact with computer documents whose contents are related to the topic includes:

measuring a cumulative amount of time of user interaction with the selected computer documents whose contents are related to the topic;

measuring a frequency of user interaction with the selected computer documents whose contents are related to the topic; and measuring a recentness of user interaction with the selected computer documents whose contents are related to the topic.

18. The method of claim 12 wherein measuring the pertinence of the topic to the contents of the selected computer documents includes:

measuring the number of selected computer documents whose contents are related to the topic;

measuring a degree of association between the topic and the contents of each selected computer document; and measuring an amount of repetition of the topic in the contents of the selected computer documents.

19. The method of claim 12 wherein the identifying of the topics related to the contents of the computer document includes extracting terms from the contents.

20. The method of claim 19 wherein the generating of the search topics from the identified topics includes generating terms associated with the extracted terms.

21. The method of claim 19 wherein the generating of the search topics from the identified topics includes generating terms analogous to the extracted terms.

22. A computer system for locating computer data of interest to a user, comprising:

a document access monitor that monitors interactions of the user with a group of computer data and that, without user intervention, analyzes contents of the group of computer data in order to identify a term related to the contents;

wherein the document access monitor monitors the interactions of the user with a plurality of groups of computer data and identifies a plurality of terms that relate to the groups of computer data, and user interactions information for a plurality of groups of computer data, prioritize the received identified terms based on the received user interactions information, establishes a priority level, and selects the identified terms with priorities above the established priority level to be the determined topics of user interest;

a topic analyzer that receives monitored user interactions information, that receives an identified term, and that uses the received user interactions information to determine at least one topic of user interest related to the received identified term; and a new document identifier that operates without user intervention, that receives at least one determined topic of user interest, that locates additional groups of computer data that are related to the received determined topics of user interest, and that selects the located groups of computer data for the user;

generating search topics from the identified topics and the monitored user interactions such that the generated topics of interest to the user are discarded if monitored user interactions with the displayed computer documents whose contents are related to the topic do not reach a threshold level;

wherein a plurality of groups of computer data have been designated to be interacted with in the future by the user, and wherein the new document identifier locates additional groups of computer data by analyzing designated groups of computer data to determine if they are related to the received determined topics of user interests;

choosing related designated groups of computer data to be the located additional groups of computer data so that the chosen groups of computer data will be presented to the user before other groups of computer data.

23. The computer system of claim 22 wherein interactions of the user with the group of computer data a re monitored by a computer other than the computer system, and wherein the other computer sends monitored user interactions information to the computer system.

24. The computer system of claim 22 wherein a group of computer data is a computer document stored on a computer, wherein the computer system communicates with other computers via a computer network, and wherein locating additional groups of computer data involves using a computer document search engine to search for accessible computer documents on devices on the computer network.

25. The computer system of claim 22 wherein groups of computer data are consecutively made available for a limited time, and wherein the new document identifier locates additional groups of computer data by analyzing groups of computer data while they are available to determine if the data is related to the received determined topics of user interest.

26. A computer-readable medium containing instructions for controlling a computer system to locate computer data of interest to a user by:

monitoring interactions of the user with computer data; and without user intervention,
extracting a term from contents of the computer data;
using the monitored user interactions to determine at least one topic of user interest that is related to the extracted tern;
determining the identified topic of most interest to the user based on the monitored user interactions that includes prioritizing the identified topics based on the monitored user interactions;

establishing a priority level; and selecting the identified topics with priorities above the established priority level to be the determined topics of user interest;

generating topics of interest to the user from the recorded interactions information and the identified topics such that the generated topics of interest to the user are discarded if monitored user interactions with the displayed computer documents whose contents are related to the topic do not reach a threshold level;

locating additional computer data that is related to the determined topics of user interest which includes analyzing designated groups of computer data to determine if they are related to the determined topic; and choosing related designated groups of computer data to be the located additional groups of computer data so that the chosen groups of computer data will be presented to the user before other groups of computer data; and selecting the located additional computer data for the user.

27. The computer-readable medium of claim 26 wherein a plurality of terms are extracted from the computer data, and wherein using the monitored user interactions includes:

prioritizing the extracted terms based on the monitored user interactions:

establishing a priority level; and selecting the extracted terms with priorities above the established priority level to be the determined topics of user interest.

28. The computer-readable medium of claim 26 wherein the interactions of the user with the computer data are monitored by a computer other than the computer system, and wherein the other computer sends monitored user interactions information to the computer system.

29. The computer-readable medium of claim 26 wherein computer data is a computer document stored on a computer, wherein the computer system communicates with other computers via a computer network, and wherein locating additional computer data involves using a computer document search engine to search for accessible computer documents located on any computer on the computer network.

* * * * *

UNITED STATES PATENT AND TRADEMARK OFFICE
CERTIFICATE OF CORRECTION

PATENT NO.    : 6,473,752 B1
DATED         : October 29, 2002
INVENTOR(S)   : Hoyt A. Fleming, III It is certified that error appears in the above-identified patent and that said Letters Patent is hereby corrected as shown below:

<u>Title page,</u>
Item [56], References Cited, U.S. PATENT DOCUMENTS, "4,034,071 A 7/1977 Thomas et al." should read -- 4,034,194 A 7/1977 Thomas et al. --
OTHER PUBLICATIONS, 2nd reference "pp. 1-8, (visited" should read -- pp. 1-8 (visited --;
3rd reference "When should the Advanced Query form be used"," should read -- When Should the Advanced Query Form be Used," --;
3rd reference "advanced.htm, (visited" should read -- advanced.htm (visited --;
5th reference "Refine help," should read -- Refine Help, --;
5th reference "tent/help.htm, visited (Apr." should read
-- tent/help.htm (visited Apr. --;

<u>Column 1,</u>
Line 18, "enabled users lo" should read -- enabled users to --
Line 20, "files tog-ether" should read -- files together --
Line 33, "often wart" should read -- often want --

<u>Column 2,</u>
Line 53, "option Even" should read -- option. Even --

<u>Column 4,</u>
Line 45, "located on computer" should read -- located on the computer --

<u>Column 5,</u>
Line 31, "then routs" should read -- then routes --
Line 38, "interactions cart" should read -- interactions can --

<u>Column 6,</u>
Line 20, "could be analysed" should read -- could be analyzed --
Line 29, "end generates" should read -- and generates --
Line 35, "extracted terms; due to" should read -- extracted terms due to --
Line 39, "strike." and a "flying mammal")." should read -- strike," and a "flying mammal." --
Line 40, "and "pine tar")." should read -- and "pine tar." --

UNITED STATES PATENT AND TRADEMARK OFFICE
CERTIFICATE OF CORRECTION

PATENT NO. : 6,473,752 B1
DATED : October 29, 2002
INVENTOR(S) : Hoyt A. Fleming, III It is certified that error appears in the above-identified patent and that said Letters Patent is hereby corrected as shown below:

Column 8,
Line 22, "In step) 315," should read -- In step 315, --

Column 10,
Line 55, "851) corresponds" should read -- 850 corresponds --

Column 11,
Line 33, "terms 30 "President"" should read -- terms "President" --

Column 12,
Line 26, "topics, topic prioritization!" should read -- topics and topic prioritization --

Column 13,
Line 51, "on 8/18. 1 he frequency" should read -- on August 18. The frequency --

Column 15,
Line 26, "can specify! an exact" should read -- can specify an exact --

Column 17,
Line 1, "computer living access" should read -- computer having access --

Column 18,
Line 4, "of computer data.; and" should read -- of computer data; and --

Column 19,
Line 3, "measuring, a degree" should read -- measuring a degree --

UNITED STATES PATENT AND TRADEMARK OFFICE
CERTIFICATE OF CORRECTION

PATENT NO.    : 6,473,752 B1
DATED         : October 29, 2002
INVENTOR(S)   : Hoyt A. Fleming, III It is certified that error appears in the above-identified patent and that said Letters Patent is hereby corrected as shown below:

<u>Column 21,</u>
Line 13, "computer data a re" should read -- computer data are --

Signed and Sealed this

Ninth Day of September, 2003

JAMES E. ROGAN
*Director of the United States Patent and Trademark Office*